(12) United States Patent
Hirth et al.

(10) Patent No.: US 7,476,825 B2
(45) Date of Patent: Jan. 13, 2009

(54) ROLLER SEAM WELDED BODY FOR EXHAUST GAS TREATMENT AND PROCESS FOR PRODUCING THE BODY

(75) Inventors: Peter Hirth, Köln (DE); Rolf Brück, Bergisch Gladbach (DE); Thomas Härig, Neunkirchen-Seelscheid (DE)

(73) Assignee: Emitec Gesellschaft Fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 11/352,808

(22) Filed: Feb. 13, 2006

(65) Prior Publication Data

US 2006/0144900 A1 Jul. 6, 2006

Related U.S. Application Data

(63) Continuation of application No. PCT/EP2004/008560, filed on Jul. 30, 2004.

(30) Foreign Application Priority Data

Aug. 13, 2003 (DE) ................. 103 37 265

(51) Int. Cl.
*B23K 11/06* (2006.01)
*F01N 3/00* (2006.01)
(52) U.S. Cl. .................... 219/83; 219/117.1; 60/282
(58) Field of Classification Search .......... 219/55, 219/117.1, 78.01, 83; 60/282
See application file for complete search history.

(56) References Cited

U.S. PATENT DOCUMENTS

| 4,273,681 | A | | 6/1981 | Nonnenmann |
| 4,316,823 | A | | 2/1982 | Bozon et al. |
| 4,832,998 | A | | 5/1989 | Cyron |
| 5,045,403 | A | | 9/1991 | Maus et al. |
| 5,105,539 | A | | 4/1992 | Maus et al. |
| 5,130,208 | A | | 7/1992 | Maus et al. |
| 5,139,844 | A | | 8/1992 | Maus et al. |
| 5,157,010 | A | | 10/1992 | Maus et al. |
| 5,552,573 | A | * | 9/1996 | Okita et al. .................. 219/118 |
| 5,628,925 | A | * | 5/1997 | Domesle et al. ......... 219/121.64 |
| 6,190,784 | B1 | | 2/2001 | Maus et al. |
| 2004/0013580 | A1 | * | 1/2004 | Bruck et al. ................. 422/171 |
| 2004/0187456 | A1 | | 9/2004 | Brück |
| 2004/0194440 | A1 | | 10/2004 | Brück |

FOREIGN PATENT DOCUMENTS

| DE | 733 200 | 3/1943 |
| DE | 938 345 | 1/1956 |
| DE | 28 12 415 | 10/1978 |
| DE | 29 02 779 | 7/1980 |

(Continued)

*Primary Examiner*—Kevin P Kerns
(74) *Attorney, Agent, or Firm*—Laurence A. Greenberg; Werner H. Stemer; Ralph E. Locher (57) ABSTRACT

A process for producing a body for exhaust gas treatment having a plurality of metallic layers, includes bringing the layers into contact with each other in a connection region. A connection is made by a roller seam welding process in such a way that the layers form passages through which a gas stream can flow. A corresponding body for exhaust gas treatment can especially be used as a filter or catalyst carrier body in the automobile industry.

19 Claims, 3 Drawing Sheets

FOREIGN PATENT DOCUMENTS

| | | |
|---|---|---|
| DE | 88 16 154.4 | 2/1989 |
| DE | 42 19 619 C1 | 1/1994 |
| DE | 44 11 302 C1 | 10/1995 |
| DE | 201 17 873 U1 | 3/2002 |
| DE | 101 53 283 A1 | 5/2003 |
| DE | 101 53 284 A1 | 5/2003 |
| DE | 102 23 452 A1 | 12/2003 |
| EP | 0 245 737 B1 | 8/1989 |
| EP | 0 665 367 A2 | 10/1992 |
| EP | 0 665 367 A3 | 10/1992 |
| EP | 0 690 763 B1 | 7/1997 |
| EP | 1 230 978 | 2/2002 |
| EP | 0 705 962 B1 | 8/2002 |
| GB | 2 139 131 A  * | 11/1984 |
| WO | WO 90/03220 | 4/1990 |
| WO | WO 90/08249 | 7/1990 |
| WO | WO 91/01178 | 2/1991 |
| WO | WO 91/01807 | 2/1991 |
| WO | WO 97/49905 | 12/1997 |

* cited by examiner

ROLLER SEAM WELDED BODY FOR EXHAUST GAS TREATMENT AND PROCESS FOR PRODUCING THE BODY

CROSS-REFERENCE TO RELATED APPLICATION

This is a continuing application, under 35 U.S.C. §120, of copending International Application PCT/EP 2004/008560, filed Jul. 30, 2004, which designated the United States; this application also claims the priority, under 35 U.S.C. §119, of German Patent Application 103 37 265.2, filed Aug. 13, 2003; the prior applications are herewith incorporated by reference in their entirety.

BACKGROUND OF THE INVENTION

Field of the Invention

The present invention relates to a process for producing a body for exhaust gas treatment, which has a plurality of metallic layers forming passages through which a gas stream can flow. Bodies of that type are used in particular for purifying the exhaust gases from mobile internal combustion engines, such as spark ignition or diesel engines. Primary application areas in this context are passenger automobiles as well as trucks and motorcycles. It is also known for such bodies to be used in exhaust systems of portable hand-held appliances such as, for example, power saws, lawnmowers, etc. Bodies of that type have a number of different functions. For example, they are used as catalyst carrier bodies, as adsorbers, as filters, as flow mixers or as mufflers. The body is usually distinguished by a favorable ratio of surface area to volume, i.e. it has a relatively large surface area and therefore ensures intensive contact with the gas stream flowing through it.

With regard to catalyst carrier bodies, the surface or body is provided with a catalytically active coating, which preferably includes a washcoat. The washcoat has a particularly fissured surface, so that the ratio of surface area to volume can be improved even further. The washcoat is impregnated with various catalysts, for example platinum, rhodium or the like.

Adsorbers substantially have a similar basic structure to that selected for bodies used as catalyst carrier bodies. However, a different objective is pursued with regard to the coating, so that consequently different coatings are used. The purpose of the adsorbers is, for example, to retain nitrogen oxides until suitable reaction partners and/or temperatures are present to allow those constituents of the exhaust gas to be converted as fully as possible.

Flow mixers are distinguished by the fact that their bodies have a multiplicity of passages which are flow-connected to one another. At the same time, guide surfaces, which allow the partial gas streams to be diverted, are provided in the interior of the body or of the passages. In that way, the gas stream is made more uniform in terms of its pollutant concentration, its flow properties, its temperature, etc.

A wide range of different structural forms are known for the above-mentioned bodies as catalyst carrier bodies, adsorbers, mufflers and flow mixers. Those forms include, for example, honeycomb bodies having at least partially structured sheet-metal foils. As compared to known bodies made from ceramic material, the metallic honeycomb bodies have a considerably greater flexibility in terms of their intended use and also allow a greater degree of design freedom. It should also be borne in mind that particularly effective conversion processes with regard to the pollutant concentration are ensured due to good heat conduction and extremely low area-specific heat capacity.

A distinction is drawn in particular between two typical structures of metallic honeycomb bodies. An early structure, of which German Published, Non-Prosecuted Patent Application DE 29 02 779 A1, corresponding to U.S. Pat. No. 4,273,681 shows typical examples, is the helical structure, in which substantially one smooth and one corrugated sheet-metal layer are placed on top of one another and wound helically. In another structure, the honeycomb body is constructed from a multiplicity of alternately disposed smooth and corrugated or differently corrugated sheet-metal layers, the sheet-metal layers initially forming one or more stacks which are then intertwined. In that case, the ends of all of the sheet-metal layers come to lay on the outside and can be connected to a housing or tubular casing, producing numerous connections, which increase the durability of the honeycomb body. Typical examples of those structures are described in European Patent EP 0 245 737 B1, corresponding to U.S. Pat. Nos. 4,946,822; 4,923,109; 4,832,998 and 4,803,189, or International Publication No. WO 90/03220, corresponding to U.S. Pat. Nos. 5,139,844; 5,135,794 and 5,105,539. It has also long been known to equip the sheet-metal layers with additional structures in order to influence the flow and/or bring about cross-mixing between the individual flow passages. Typical examples of those configurations include International Publication No. WO 91/01178, corresponding to U.S. Pat. No. 5,403,559, International Publication No. WO 91/01807, corresponding to U.S. Pat. Nos. 5,130,208 and 5,045,403, and International Publication No. WO 90/08249, corresponding to U.S. Pat. No. 5,157,010. Finally, there are also conical honeycomb bodies, optionally also with further additional structures for influencing the flow. A honeycomb body of that type is described, for example, in International Publication No. WO 97/49905, corresponding to U.S. Pat. No. 6,190,784. Furthermore, it is also known to leave free a cutout in a honeycomb body for a sensor, in particular for accommodating a lambda sensor. One such example is described in German Utility Model DE 88 16 154 U1.

Of course, the structures described above are also suitable for forming filter bodies. Basically, two different principles are known for those or other filter bodies. One principle relates to what is known as the "closed particulate filter", in which the passages formed by the body are closed on alternate sides, therefore forcing the gas stream to pass through passage walls including filter material. That leads to the accumulation of particulates or solids contained in the gas stream, which are burnt and/or oxidized continuously or at predeterminable intervals. An alternative known structure is that of the "open particulate filter", which is not closed on alternate sides, but rather has flow diversion points in the interior of the passages, which cause the partial gas streams to be swirled up in such a way that at least 80% of the partial gas streams pass through the filter wall, preferably a number of times. The major advantage of the "open particulate filter" is that blockage of the filter material caused by an excessive accumulation of particulates is avoided. A particulate filter is described as "open" if particulates can fundamentally flow completely through it, specifically including particulates which are considerably larger than the particulates that are actually to be filtered out. As a result, a filter of that type cannot become blocked even in the event of an agglomeration of particulates during operation. A suitable method for measuring the openness of a particulate filter is, for example, to test the diameter up to which spherical particles can still trickle through a filter of that type. In present applications, a filter is open in particular if spheres with a diameter of greater than or equal to 0.1 mm can still trickle through it, preferably spheres with a diameter of over 0.2 mm. One such example is given in German Utility Model DE 201 17 873 U1, to which reference is made in full for the purposes of explanation.

In addition to those bodies with wound or intertwined layers, it is also known to use what are known as plate filters, which include a plurality of in particular sheet-like or substantially planar filter plates that are disposed spaced apart from one another. Plate filters of that type are usually also constructed in accordance with the principle of passages that are closed on alternate sides, but it is in principle also possible to realize an "open particulate filter".

Whereas wound structures and plate structures of that type have the gas stream flowing through them substantially axially, bodies or filter bodies which the gas stream flows through radially are also known. Such bodies usually have an inner flow passage and an outer flow passage which is annular in form and is generally disposed coaxially with respect to the inner flow passage. The inner flow passage is generally delimited by an inner tube, which is provided with openings through which the gas stream to be purified is passed. Layers of a filter material are disposed around the inner tube. Substantially two different concepts are known in that respect. The first concept can be described on the basis of a "star shape", which is realized when the filter plates are viewed in the direction of the inner tube or a cross section perpendicular to the inner tube. That means in other words that the filter plates form folds which extend substantially parallel to the axial extent of the inner tube. Another known concept involves the formation of folds in the circumferential direction, in which case a plurality of the folds are positioned on the inner tube, spaced apart from one another in the axial direction. According to the routing of the flow, the gas stream that is to be purified is fed to the filter material from the inside (or from the outside), penetrates through the filter material and is discharged again on the opposite side.

The bodies described above generally include a plurality or multiplicity of different components made from in some cases different materials. Considering the high thermal and dynamic stresses in the exhaust system of mobile internal combustion engines, those individual components have to be permanently connected to one another. Numerous different connection techniques are known for that purpose, for example brazing and/or welding. With regard to those connection techniques, it should be noted that they have to be suitable for at least medium-sized series production. In that respect, cost aspects also play an important role, such as cycle rates, connection quality, process reliability, etc. Known processes used to form connections by technical joining (in particular in the structure including the filter surfaces and/or the layers) require an additional material such as, for example, brazing material or weld filler. It is particularly difficult in that case for the filler to be applied at precisely the location at which a join is subsequently to be produced. Moreover, it should be noted that increasingly thin-walled materials need to be used, since such materials very quickly adapt to the temperature of the exhaust gas and accordingly have highly dynamic reaction properties. In order to ensure the long-term functionality of those bodies, however, a spatially tightly delimited introduction of heat is required to form the connections by technical joining. Heretofore, that has not been achievable to a satisfactory extent, and indeed brazing generally requires heating of the entire body in a high-temperature vacuum furnace, and welding has heretofore usually also been carried out through the outer housing, and consequently in that case too considerable temperature gradients have been realized across a large part of the body.

SUMMARY OF THE INVENTION

It is accordingly an object of the invention to provide a roller seam welded body for exhaust gas treatment and a process for producing the body, which overcome the hereinafore-mentioned disadvantages and technical problems of the heretofore-known devices and processes of this general type, in which the process for producing metallic bodies of this type for exhaust gas purification is inexpensive, simple, effective and reliable and is suitable for automation as far as possible, producing connections by joining which are distinguished by a particularly long service life, and in which the corresponding body for exhaust gas treatment can be configured variably and is versatile in use.

With the foregoing and other objects in view there is provided, in accordance with the invention, a process for producing a body for exhaust gas treatment. The process comprises bringing a plurality of metallic layers into contact with one another in a connection region. A connection of the layers is produced by a continuous resistance welding process, causing the layers to form passages or channels through which a gas stream can at least partially flow. In other words, this means in particular that the connection between layers disposed adjacent one another is effected by the continuous resistant welding process.

In this context, it should be noted that the term "continuous" may mean that the welding takes place along one welding track, in which case the weld seam that is generated is made uninterrupted. However, this need not necessarily be the case. For example, it is also possible for a plurality of weld seams which are spaced apart to be provided along the welding track, in which case the proportion in which the weld seams are present along the welding track is advantageously significantly greater than the proportion formed by the interruptions. It is particularly preferable for the proportion formed by the weld seam, based on the welding track, to amount to at least 80%, in particular even more than 90%.

With regard to the "passages", it should also be noted that these passages need not necessarily have a tube-like structure. Rather, this term is to be understood as meaning a limited flow path which has a spatial boundary. In this case, the boundary is generally configured in such a way that it encloses the flow path over at least 60% (in particular 80%) of the circumference, with the length of the flow path advantageously being greater than the circumference.

In view of the fact that the above-mentioned body may also be constructed as a filter, it will be clear that the passages do not necessarily need to have a gastight passage wall, i.e. it is also eminently possible for the layers to be configured so as to be at least partially gas-permeable. In particular in this case, the gas stream does not flow completely through the passage, in which case although the passage does have a suitable cross section, the gas stream nevertheless uses a different route. Therefore, it is considered sufficient for the passage to offer the option of at least partially allowing a gas stream to flow through it, in particular with open end sides.

In accordance with another mode of the invention, the continuous resistance welding process includes roller seam welding and/or projection seam welding.

Roller seam welding and projection seam welding processes belong to pressure-joining welding processes, in particular resistance pressure welding or conductive pressure welding. In the resistance pressure welding process, the heating at the welding location takes place as a result of Joule resistance heating when current flows and through the use of an electrical conductor. The current is supplied through electrodes with a convex or planar working surface. Two roller-like (driven) electrodes are used for the roller seam welding. The metal sheets to be welded are disposed predominantly overlapping in this case. In practice, roller seam welding is a continuous spot welding, but using roller-like electrodes. Unlike the case when using resistance spot welding, the electrodes remain in contact after the first weld spot has been produced and are then rolled continuously onward. Further current flows at the locations where a weld spot is to be formed. Spot seams or sealed seams with overlapping weld nuggets or weld spots are produced, depending on the feed rate of the electrodes and the frequency of the welding current. Permanent direct current likewise produces a sealed seam.

The use of this production process to connect the layers has proven particularly advantageous in particular with a view toward series production of these bodies. The process in which the two layers adjacent or lying on top of one another are passed through the rotating electrodes is surprisingly well able to withstand the high thermal and dynamic stresses, for example in the exhaust system of automobiles. It has also been established that even in the case of very thin metal foils which are connected to one another in this way, sealed weld seams can be produced in very short working cycles. As a result, it is possible to achieve in particular a cost benefit, which was unexpected in view of the additional material that is required for the overlap between the two layers. Roller seam welding is suitable in particular for connection regions which have a certain length, i.e. extend over a predetermined portion. This should generally amount to at least 5 cm, in particular at least 15 cm, and the work can be carried out at particularly low cost beyond a length of 25 cm. The roller seam welding makes do without filler. Furthermore, in many cases it is also possible to do without a step of cleaning the layers, since the introduction of the electrode force ensures that contact between the electrodes and/or the layers which is sufficient for the flow of current and the formation of the weld spot is already ensured to a considerable extent. Moreover, only an insignificant change in the microstructure of the layer adjacent the weld nugget can be established. Accordingly, the use of this manufacturing process offers numerous advantages and at the same time overcomes all of the technical problems listed in the introduction hereto at once. Moreover, the process can also be applied to each of the types of bodies mentioned in the introduction hereto.

In accordance with a further mode of the invention, a weld seam in which there are at least overlapping weld spots is formed, at least in part. This applies in particular to the case in which the ends or edge regions of the layers are to be fixed to one another. These edge regions or edges, for example, close up flow paths, so that the exhaust gas to be purified is forced to pass through a filter material. In order to ensure the principle of a "closed particulate filter", a sealed seam should be at least partially present. This is to be understood as meaning that the welding current pulses take place in succession at such short time intervals that the respectively adjacent weld spots or weld nuggets merge into one another, i.e. there are no unconnected locations on the layers between adjacent weld spots. As has already been stated above, a sealed seam of this type is achieved by virtue of the frequency of the current pulses being selected to be relatively short, the feed rate being relatively low or by the presence of direct current, i.e. current flows continuously between the electrodes during the feeding.

In accordance with an added mode of the invention, a feed rate during roller seam welding in a range of from 0.5 cm/s to 30 m/s, in particular in a range of from 0.5 m/min to 30 m/min, is used.

This feed rate is used in particular when connecting metallic foil material which has a thickness of from 0.03 to 0.1 mm. In this case, the material to be connected preferably includes the following constituents: from 0.1 to 7.5% by weight of aluminum, and from 17 to 25% by weight of chromium. Another preferred material includes from 12 to 32% by weight of nickel.

In accordance with an additional mode of the invention, during the welding operation, the electrodes exert a force of from 10 N to 20 kN, in particular from 200 N to 6 kN, on the layers. This ensures that, for example, any rolling oil or similar impurities adhering to the layers are forced out of the welding location. The result is both intensive contact between the components which are to be connected to one another and between the components and the electrodes. At the same time, this ensures that when the material is heated, the heated or molten materials are intimately mixed, so as to achieve a permanent connection.

In accordance with yet another mode of the invention, the layers, at least in an edge region, are laid on top of one another, are welded at least over a portion in this edge region and are then deformed, so as to form the passages. In other words, this also means that the weld seam at least partially delimits the passage through which the exhaust gas can flow. With regard to the preferred magnitudes of the length of the portion, reference should be made to the statements given above. In principle, however, it should also be noted that it is customary for the complete edge regions to be connected to one another, i.e. accordingly the portion corresponds to the longest extent of the edge region.

In accordance with yet a further mode of the invention, the layers are formed with at least one metallic foil which is made from a high-temperature-resistant and corrosion-resistant material and is preferably at least partially structured and/or allows a fluid to flow through it at least in regions. With regard to the material of the metallic foil, reference should be made at this point to the composition listed above. Furthermore, however, a person skilled in the art will be aware of a large number of further materials which are suitable for use in mobile exhaust gas systems. In this case, reference should be made to the large number of different materials which are given in the known prior art. When making a choice, it should also be borne in mind that this material must in general terms be suitable for resistance welding, i.e. in particular must also conduct current.

The preferred configuration of the metallic foil with structures or apertures, pores, holes or the like in this case is predominantly located outside the edge regions which are used for connection by roller seam welding. Examples of suitable structures include corrugations, guide vanes, stamped formations or other structures. They are usually used to guide or swirl up the exhaust gas flowing along the metallic foil, in order to ensure intimate contact with the surface of the body in this way. Furthermore, these structures can also be used to make sure that the layers are at a predeterminable distance from one another. In this case, the structure represents a type of spacer. The effect of the foil being configured such that medium can flow through it at least in regions is that gas exchange can take place through the metallic foil. This usually depends on a forced flow, for example imposed by diverting vanes, sealing materials, etc. or by pressure differences in adjacent passages, which are in each case partially delimited by the metallic foil.

In accordance with yet an added mode of the invention, the layers are formed with a filter fabric which may be a non-woven or fleece filter fabric or a supporting structure including a filter material. The filter fabric includes in particular knitted fabrics, woven fabrics or similar configurations of chips, fibers or other particles which are bonded to one another. They are held together, for example, by sintered connections, brazed connections, welding connections or combinations thereof. The filter fabrics may be composed of metallic or ceramic material. Furthermore, it is also possible to provide a supporting structure on or in which a filter material is provided. Suitable supporting structures are once again woven fabrics, knitted fabrics, expanded metals or the like, in particular coarse-mesh formations, in the cavities of which the filter material is provided. It is in this context particularly advantageous for the supporting structure to be metallic in form, in which case both ceramic and metallic materials can be used as filter material. The filter material is connected to the supporting structure through the use of sintered connections, diffusion bonds, if appropriate also using filler materials, or combinations of these connection techniques. The connection according to the invention between the layers using a continuous resistance weld seam can also be carried out so as to incorporate this supporting structure, in particular by the layers being welded to one another exclusively through the supporting structures.

The filter material itself forms an extremely high surface area with a multiplicity of pores, openings, flow passages and cavities. As the gas stream flows through the filter material, the undesired particulates stick to the surface and are converted into gaseous constituents when heat and/or reaction partners contained in the exhaust gas are supplied.

In accordance with yet an additional mode of the invention, the layers have a multi-part structure, and the layers are provided with a metallic foil in the connecting region, so that the metallic foils of layers disposed adjacent one another are connected through the use of roller seam welding. This means in particular that the foils are provided only in the edge region of the layers. In this case, for a filter material or a supporting structure, they preferably form a construction which is suitable for roller seam welding. It is in this way possible to adapt components of the body which cannot normally be connected by such a process, to the requirements of roller seam welding.

In accordance with again another mode of the invention, the layer includes a filter fabric. The filter fabric, in the edge region which subsequently forms the connecting region, is surrounded, and preferably also flanged, by in each case one metallic foil. Finally, a plurality of layers produced in this way are welded to one another. In this case, the layers are configured in particular as a filter composite or filter layer as proposed by German Published, Non-Prosecuted Patent Application 101 53 284 A1, corresponding to U.S. patent application Ser. No. 10/823,996, filed Apr. 13, 2004 and U.S. Patent Application Publication No. US2004/0187456 A1 and German Published, Non-Prosecuted Patent Application 101 53 283 A1 corresponding U.S. patent application Ser. No. 10/828,813, filed Apr. 20, 2004 and to U.S. Patent Application Publication No. US2004/0194440 A1. With regard to the construction of filter layers or filter composites of this type, reference is made to the above-referenced publications in full, and consequently the descriptions given therein are used to explain the present situation and they are incorporated herein fully by reference.

In accordance with again a further mode of the invention, with regard to the above process variant for production of the body, it is particularly advantageous if the flanging and the roller seam welding are carried out simultaneously. By way of example, structured rolled electrodes are used for this purpose, which on one hand allows the metallic foil to be hooked to the filter fabric and at the same time, due to the flow of current, allows a material or cohesive connection by technical joining. In this case, the welding process can also be carried out in such a way that flanged connections and welded connections alternate in the welding direction. In the present context, the term flanging is to be understood in particular as meaning manual or mechanical bending-over of the edges of sheet-metal parts to remove the sharpness of the edge and/or to reinforce the workpiece.

In accordance with again an added mode of the invention, the layers are welded together in such a way that they are connected in the edge regions on alternate sides to an adjacent layer in each case, so as to form a fold in each case. The procedure described herein for the production of a body is suitable in particular for producing filter bodies. In this case, the layers, which preferably also include filter fabric or a filter material, are connected to one another at their edge regions, in order to realize the principle of the "closed particulate filter". After two adjacent layers have been welded together, the layers can be folded open so that they form an angle relative to one another in an edge region. The intermediate space which has formed between the layers is referred to as a fold. This represents a passage or flow passage, in particular in the case of radial-flow particulate filters.

In accordance with again an additional mode of the invention, the layers are constructed with supports, which are preferably disposed in a passage and/or in a fold. The term support is to be understood in particular as meaning spacers, reinforcing structures, spacer pieces or similar devices which ensure that the predetermined position of the layers with respect to one another is retained even during subsequent use in the exhaust system of mobile internal combustion engines.

In accordance with still another mode of the invention, the supports are connected to the layer by the roller seam welding manufacturing process, preferably at the same time as a connection of the layers to one another is being executed. By way of example, the supports may be formed as a structure of the metallic foil, which therefore bear against regions of the adjacent layer and ensure the aperture angle or the spacing of the layers that are spaced apart from one another. The connection of the layers according to the invention by using a continuous resistance weld seam can also be carried out by incorporating these supports. Under certain circumstances, the layers are even welded to one another exclusively through the supports.

In accordance with still a further mode of the invention, the welded layers are connected to at least one housing, preferably by welding or brazing. In the case of axial-flow bodies, direct connection of the layers to the housing located on the outer side is preferred. Known brazing or welding techniques can be used for this purpose. If the body realizes a radial-flow structure, a connection to an outer housing is generally realized only indirectly, i.e. through additional elements. In structures of this type, a housing which is directly connected to the layers and is disposed on the outer periphery of the body is usually avoided, since this annular space is usually required for the incoming and/or outgoing flow of the gas stream. The outer housing is then fixed through any additional components, such as spacers, cover plates, collars or the like.

In accordance with still an added mode of the invention, in particular in the context of the radial-flow concept, it is proposed that the housing be an inner tube with a central axis, to the outer lateral surface of which inner tube the layers are secured. For this purpose, the inner tube is provided with holes or flow passages which allow the exhaust gas to flow through the inner tube without generating a high flow resistance. This makes is easy to connect the cavity disposed in the interior of the tubular casing toward the folds, which have been formed by the layers disposed on the outside. The connection of the layers toward the inner tube can be realized by mechanical connections or by thermal joining. In particular with a view toward securing by using mechanical securing measures, it is to be assumed that the inner tube preferably has a multi-part construction. The inner tube is usually equipped with a closed end, in order to divert the gas stream toward the filter surfaces.

In accordance with still an additional mode of the invention, the layers are to be disposed in such a way that the connecting regions or the folds or passages formed by the layers run in the direction of the central axis. With regard to the words "in the direction of the central axis", it should be pointed out for clarification that this does not require any particular accuracy, but rather relatively large tolerances are possible under certain circumstances. In this case, therefore, there are a plurality of folds which are disposed adjacent one another in the circumferential direction and preferably extend over a large portion of the inner tube. The connection regions between the individual layers and between the layers and the inner tube in this case run in the axial direction parallel to the central axis.

In accordance with a concomitant mode of the invention, in an alternative configuration, the layers are disposed in such a way that the connecting regions and/or the folds or passages formed by the layers run perpendicular to the central axis. With regard to the words "perpendicular to the central axis", it should be pointed out for clarification that this does not require any particular accuracy, but rather relatively large tolerances are possible under certain circumstances. The feature means in particular that the fold is constructed as an annular passage extending in the circumferential direction. A plurality of these annular folds are disposed spaced apart from one another (as seen in the direction of the central axis). The connection regions between the individual layers and between the layers and the inner tube run in the circumferential direction.

With the objects of the invention in view, there is also provided a body for treating exhaust gases from mobile internal combustion engines, in particular produced by one of the processes described above. The body comprises a plurality of metallic layers in contact with one another in a connecting region. At least some of the layers have a roller seam welded joint therebetween. The layers form passages through which a fluid can flow. A body of this type is suitable for use as a catalyst carrier body, an adsorber, a filter body or a flow mixer. It is also possible for the body to be configured in such a way as to form zones with different functions, for example by having different coatings in different zones. It is also possible for the layers to be constructed differently with regard to the gas permeability and/or the structuring in these zones, so that different exhaust-gas purification steps are passed through sequentially in the direction of flow.

The invention and the technical background will now be explained in more detail with reference to the figures. The figures show particularly preferred exemplary embodiments, although the invention is not restricted to these embodiments. Rather, the production process of roller seam welding can be used for numerous different structures of bodies for exhaust-gas purification, with in particular the connection between the layers forming the flow passages being produced by using these manufacturing processes.

Other features and further advantageous configurations which are considered as characteristic for the invention and are set forth in the appended claims, can be combined with one another in any desired way.

Although the invention is illustrated and described herein as embodied in a roller seam welded body for exhaust gas treatment and a process for producing the body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
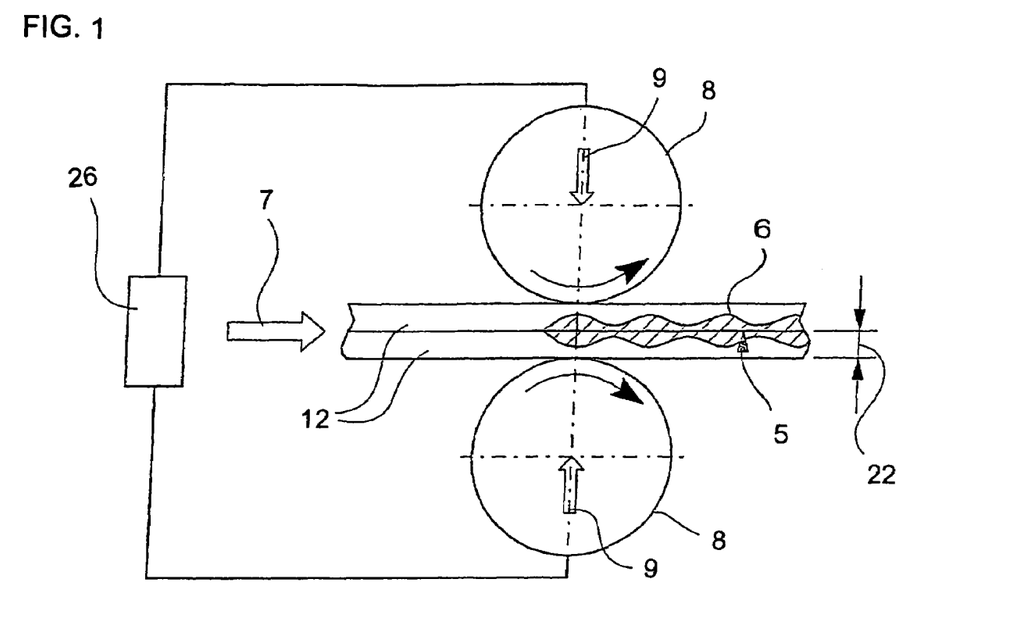
FIG. 1 is a diagrammatic and schematic view illustrating a sequence of an implementation of a process for producing a body for exhaust-gas treatment.

Referring now to the figures of the drawings in detail and first, particularly, to FIG. 1 thereof, there is seen a diagrammatic and schematic illustration of a sequence involved in the production process of roller seam welding, which is used in this case to produce a body for exhaust gas treatment. FIG. 1 illustrates two metallic foils 12 which are brought into contact with one another. The foils 12, while resting on top of one another, are passed at a feed rate 7 through two rotating electrodes 8. In the process, the two electrodes 8 press on the surface of the foils 12 with a force 9. The two electrodes 8 are connected to one another through a current source 26, with current flowing between the electrodes 8 and therefore also locally through the foils 12 with a predetermined frequency. The current leads to heating of the foils 12, so that they become at least partially molten. The foils 12 in this case have a thickness 22 which is, for example, in the range from 0.02 to 0.1 mm. As a result of Joule resistance heating, a multiplicity of weld spots 6, which preferably merge into one another so as to form a sealed seam 5, are formed in a contact region between the two foils 12.

Figure 2:
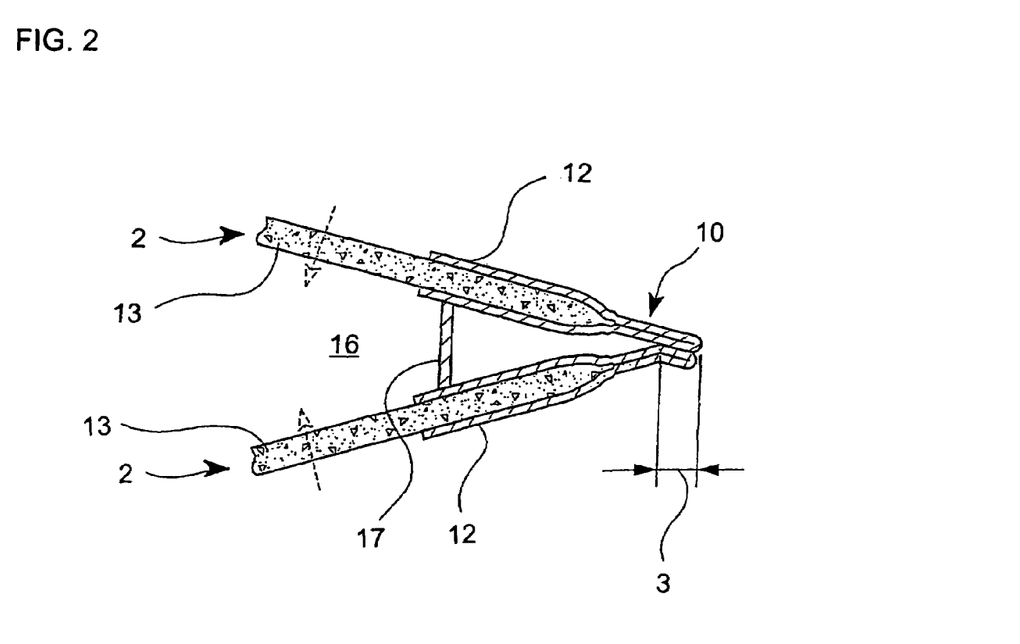
FIG. 2 is a fragmentary, sectional view of a variant embodiment of a body for exhaust-gas treatment.

FIG. 2 diagrammatically illustrates a fragmentary view of a connecting region 3, which is formed between two adjacent layers 2. The layers 2 are formed with a filter fabric 13 which may be a nonwoven or fleece filter fabric, and which is provided near an edge region 10 with a foil 12 that has been flanged. The foils 12 project beyond the filter fabric 13 and form the edge region 10, which is finally pushed through the rotating electrodes 8, so that a roller seam welded connection is produced between the two foils 12. Whereas the filter fabric 13 has a gas-permeable structure, as is indicated by dashed arrows, the foil 12 itself in this case is impermeable to gases. The foil 12 in this case serves simultaneously to fix a support 17, ensuring a defined position of the layers 2 with respect to one another, so that folds 16 are always of a desired shape.

Figure 3:
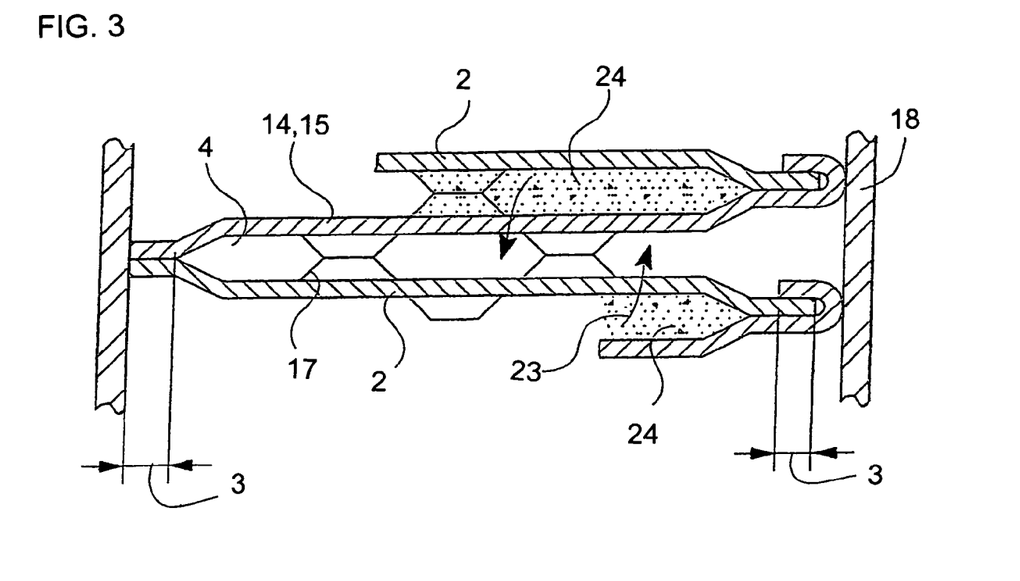
FIG. 3 is a further fragmentary, sectional view of an exemplary embodiment of the body.

FIG. 3 shows a body 1 with a plate construction, having the layers 2 disposed substantially parallel to one another. The plate-like layers 2 in the illustrated embodiment include a supporting structure 14 in which a filter material 15 has been integrated. A connecting region 3 is formed in each case in the edge regions on alternate sides of the layers 2. The connecting regions 3 again include roller seam welded connections. The connection regions 3 bear directly against a housing 18 and are connected to it by technical joining. A support 17 disposed between the layers 2 is formed, for example, of structured metal foils or structures of the layers 2 themselves, which prevent the layers 2 from bearing directly flat against one another. It can also be seen that through the use of the illustrated body 1, the principle of a "closed particulate filter" has been implemented, in which adjacent passages 4 are provided with a closure 24, so that the gas stream has to pass through the layers 2 in a direction of flow 23.

Figure 4:
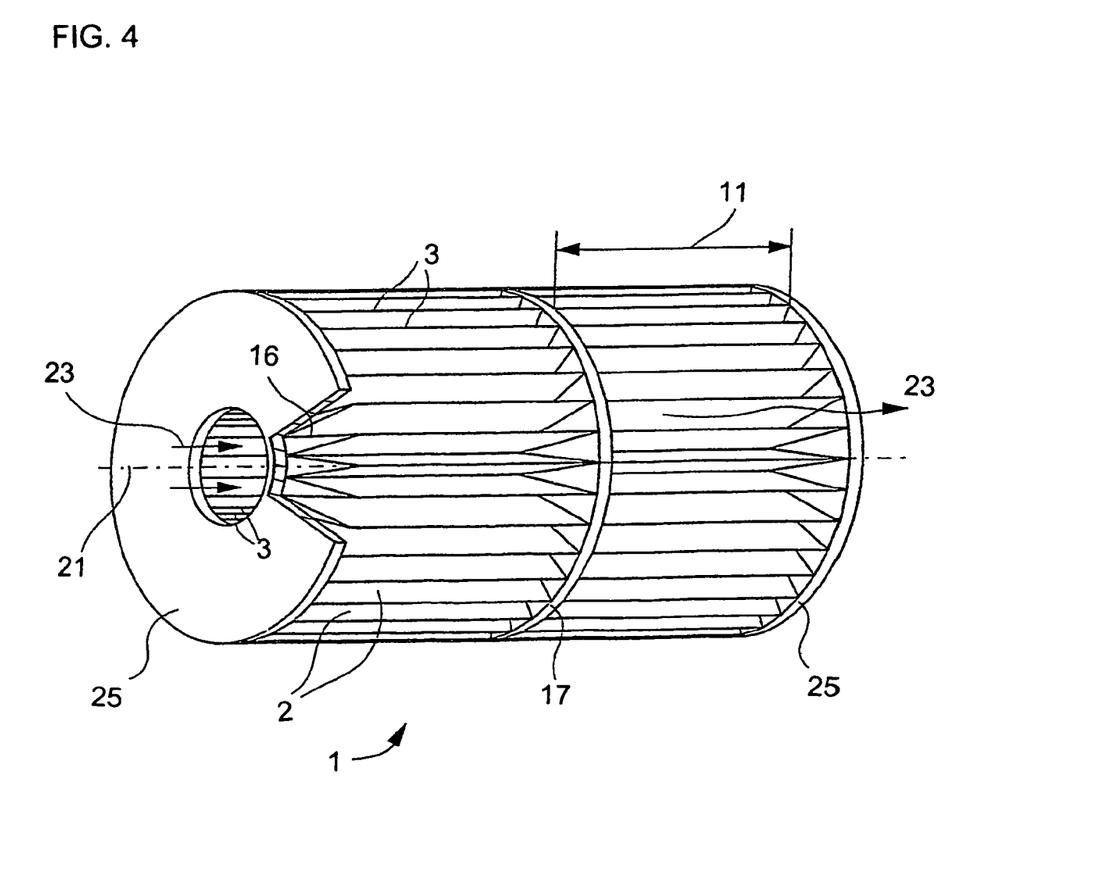
FIG. 4 is a partly broken-away, perspective view of an exemplary embodiment of a body with longitudinal folds.

FIG. 4 shows another variant embodiment of a body 1 for exhaust gas treatment, which is used in particular as a filter. This figure shows a radial-flow concept, in which the gas stream that is to be purified first of all enters an inner region in the direction of a central axis 21 through a cover plate 25. A rear-side cover plate 25 closes off the inner flow passage and therefore forces the exhaust gas to pass through the layers 2 which form the folds 16. The illustrated body 1 again has a support 17, which ensures the position of the layers 2 with respect to one another even in the event of pressure fluctuations occurring in the gas flow. In the illustrated exemplary embodiment, the layers 2 are disposed in such a way that the connection regions 3 and the folds 16 formed by the layers 2 run in the direction of the central axis 21. The connection regions 3 are in each case formed over a portion 11.

Figures 5, 5A:
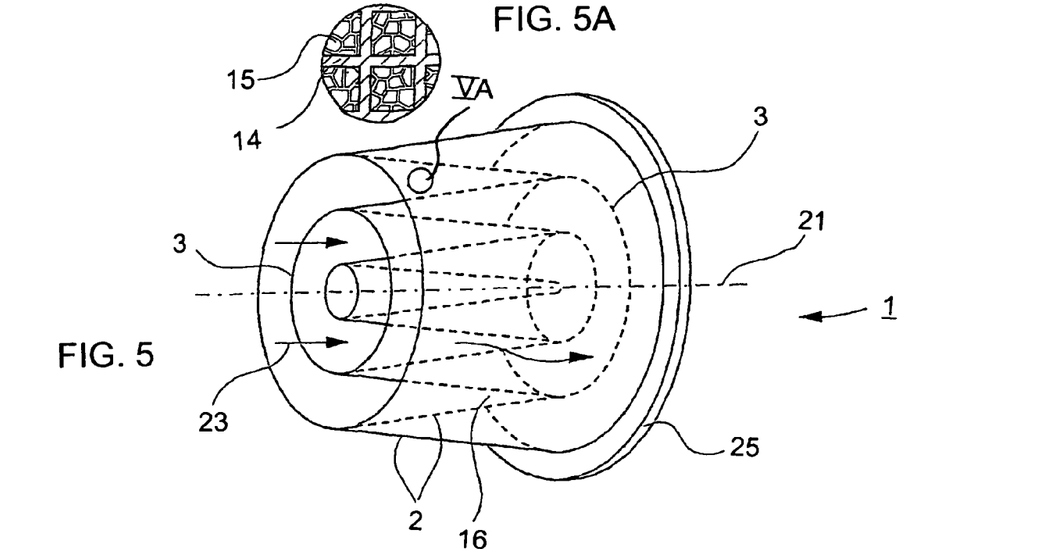
FIG. 5 is a perspective view of a further configuration of a body with coaxial folds.
FIG. 5A is an enlarged view of a portion VA of FIG. 5.

FIG. 5 shows a further variant embodiment of a body 1, in particular a filter body. In this case, the folds 16 run substantially coaxially with respect to the central axis 21. The layers 2 are mounted on end sides of a cover plate 25 which at least partially allows the exhaust gas to flow through it. The connection regions 3 of the layers 2 which are disposed adjacent one another are disposed substantially coaxially to the central axis 21, once again realizing the principle of a "closed particulate filter". The layers 2 in this case include a supporting structure 14 in which the filter material 15 is additionally provided, as is seen in FIG. 5A.

Figure 6:
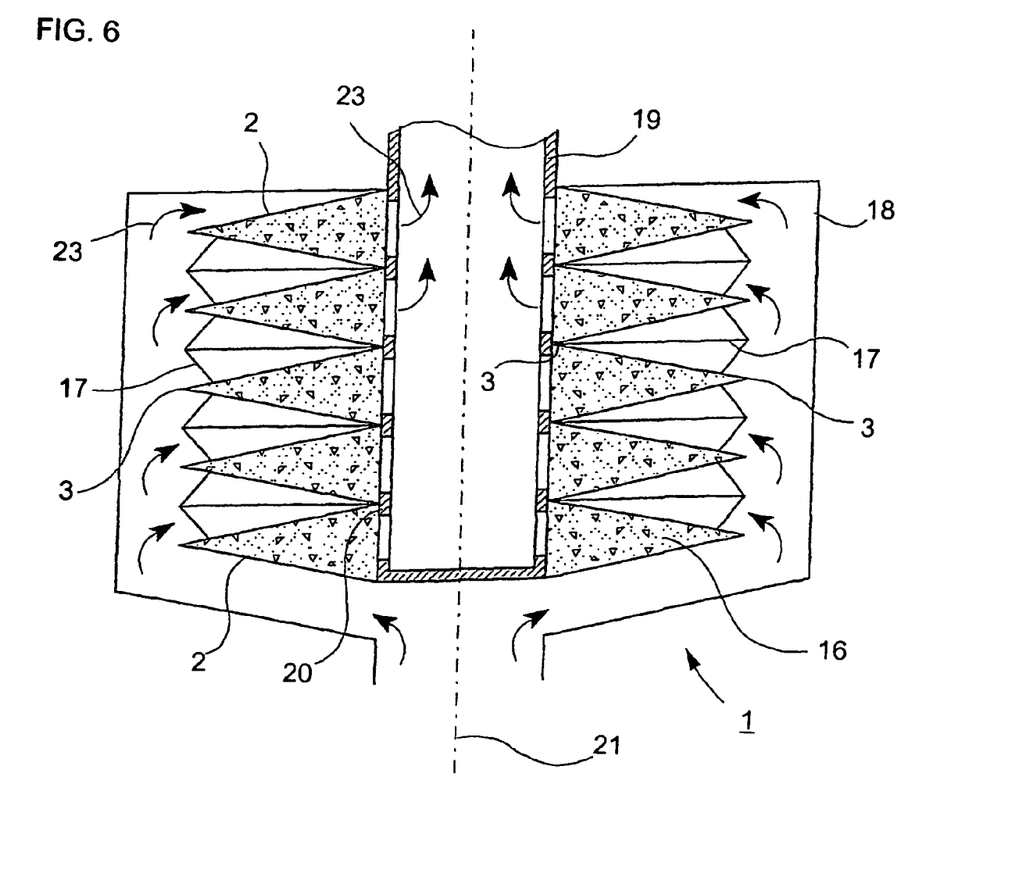
FIG. 6 is a further sectional view of a body with folds in the circumferential direction.

FIG. 6 shows a body 1 in which the layers 2 are disposed in such a way that the connection regions 3 and the folds 16 formed by the layers 2 run substantially perpendicular to the central axis 21. The layers 2 are secured to an outer lateral surface 20 of an inner tube 19. The inner tube 19 has openings through which the gas stream can enter radially inwardly, as is shown by arrows indicating a direction of flow 23. Additional supports 17 are disposed between the layers 2 outside the folds 16 which are illustrated by dots. In this case, these supports 17 are connected on one side to the inner tube 19 and on the other side to the layers 2. Moreover, the entire configuration is enclosed by a housing 18 spaced apart from the layers 2. The connection regions 3, which have been generated by using the roller seam welding process, are formed on the outer periphery and the inner periphery of the layers 2. They produce a connection in each case between the layers 2 which are disposed adjacent one another. The preferred manner of producing the technical joining connection is by brazing. However, a sintering process or even welding may be used as well.

We claim:

1. A process for producing a body for exhaust gas treatment, the process comprising the following steps:
    forming a plurality of metallic layers with a supporting structure having a filter material, with passages through which a gas stream can at least partially flow, with folds, and with supports placed in at least one of the passages or the folds;
    bringing a plurality of the metallic layers into contact with one another in a connection region;
    producing a connection of the layers by a continuous resistance welding process, causing the layers to form the passages;
    carrying out the continuous resistance welding process as roller seam welding at a feed rate in a range of from 0.5 m/min to 30 m/min with electrodes exerting a force of from 200 N to 6 KN on the layers; and
    connecting the supports to the layer at the same time as connecting the layers to one another.

2. The process according to claim 1, wherein the continuous resistance welding process is projection seam welding.

3. The process according to claim 1, which further comprises at least partially forming a sealed seam having overlapping weld spots in the continuous resistance welding process.

4. The process according to claim 1, which further comprises:
    placing the layers on top of one another, at least in an edge region;
    welding the layers at least over a portion in the edge region; and
    then deforming the layers to form the passages.

5. The process according to claim 1, which further comprises forming the layers with at least one metallic foil made from a high-temperature-resistant and corrosion-resistant material.

6. The process according to claim 5, wherein the high-temperature-resistant and corrosion-resistant material is at least partially structured and allows a fluid to flow through it at least in regions.

7. The process according to claim 5, wherein the high-temperature-resistant and corrosion-resistant material is at least partially structured.

8. The process according to claim 5, wherein the high-temperature-resistant and corrosion-resistant material allows a fluid to flow through it at least in regions.

9. The process according to claim 1, which further comprises:
    providing the layers with a multi-part structure having a metallic foil in the connecting region; and
    carrying out the continuous resistance welding process by connecting the metallic foils of the layers disposed adjacent one another by roller seam welding.

10. The process according to claim 1, which further comprises carrying out the continuous resistance welding process to connect each of the layers together in edge regions on alternate sides to an adjacent layer to form a fold.

11. The process according to claim 1, which further comprises connecting the welded layers to at least one housing.

12. The process according to claim 11, which further comprises carrying out the step of connecting the welded layers to at least one housing by welding or brazing.

13. The process according to claim 11, wherein the housing is an inner tube with a central axis and an outer lateral surface to which the layers are secured.

14. The process according to claim 13, wherein the passages formed by the layers extend in the direction of the central axis.

15. The process according to claim 13, which further comprises carrying out the continuous resistance welding process to connect each of the layers together in edge regions on alternate sides to an adjacent layer to form a fold, and at least one of the connecting regions or the folds extending in the direction of the central axis.

16. The process according to claim 13, wherein the passages formed by the layers extend substantially perpendicular to the central axis.

17. The process according to claim 13, which further comprises carrying out the continuous resistance welding process to connect each of the layers together in edge regions on alternate sides to an adjacent layer to form a fold, and at least one of the connecting regions or the folds extending substantially perpendicular to the central axis.

18. A body for treating exhaust gases from mobile internal combustion engines, the body comprising:
   a plurality of metallic layers having a supporting structure including a filter material, having passages through which a fluid flows, having folds, and having supports placed in at least one of a passage or a fold, said supports being selected from the group consisting of spacers, reinforcing structures, and spacer pieces and said supports not being coatings;
   said plurality of metallic layers being in contact with one another in a connecting region;
   at least some of said metallic layers having a roller seam welded joint therebetween;
   said supports being connected to said metallic layers and said metallic layers being connected to one another by a roller seam welded joint; and
   a housing being an inner tube with a central axis and an outer lateral surface to which said metallic layers and said connecting regions are secured;
   said passages being formed by said metallic layers extending in a direction of said central axis.

19. The body for treating exhaust gases from mobile internal combustion engines according to claim 18, wherein said metallic layers and said connecting regions are secured to said housing, and at least one of said connecting regions or said folds extends in the direction of said central axis.

* * * * *